Dec. 25, 1934.　　　　O. M. MILLER　　　　1,985,260
STEREOSCOPIC PLOTTING OF CONTOUR MAPS
Filed June 3, 1930　　　6 Sheets-Sheet 1

INVENTOR
Osborn M. Miller
BY Edward Thomas
ATTORNEY

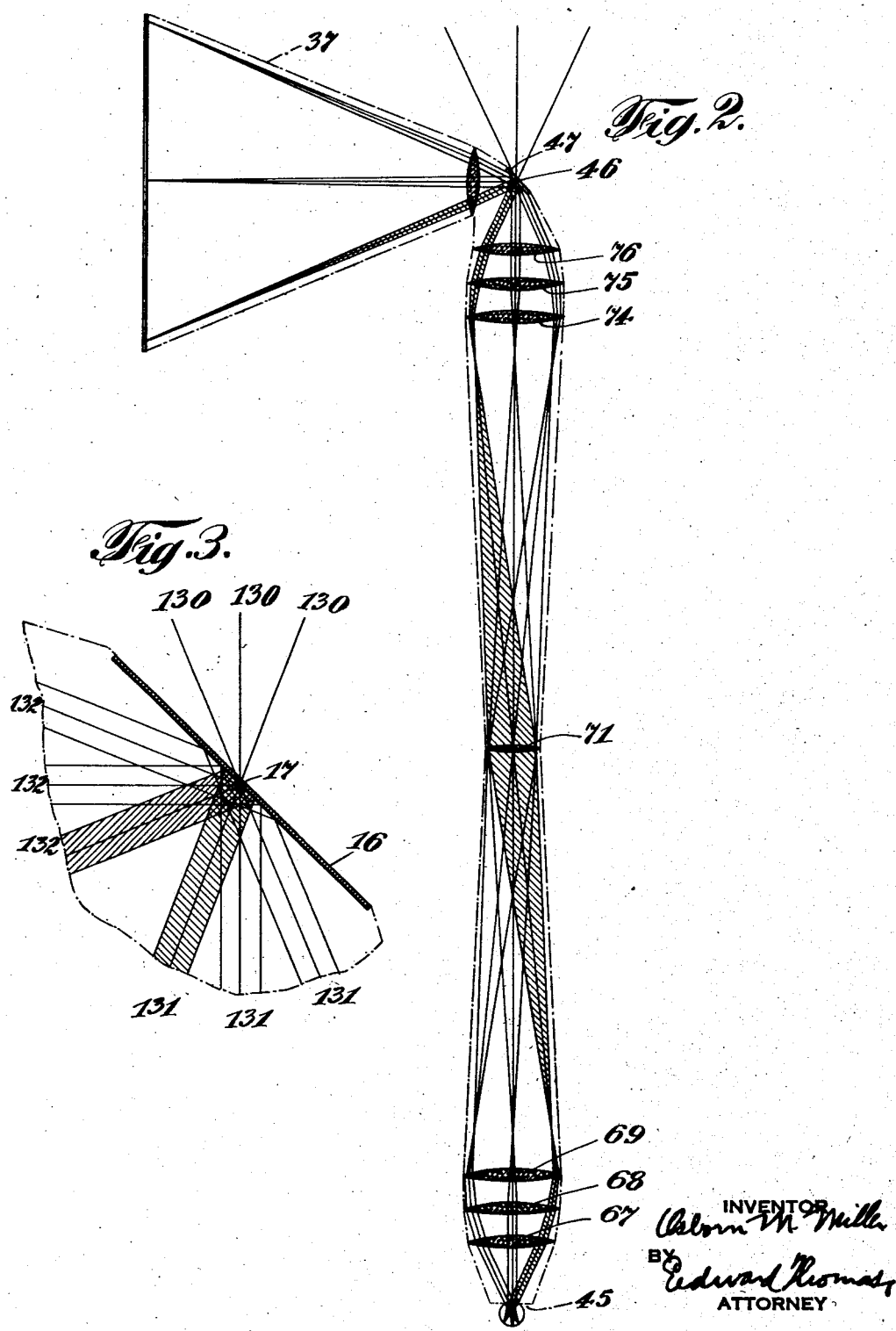

Dec. 25, 1934.   O. M. MILLER   1,985,260
STEREOSCOPIC PLOTTING OF CONTOUR MAPS
Filed June 3, 1930   6 Sheets-Sheet 3

INVENTOR
Osborn M. Miller
BY Edward Thomas
ATTORNEY

Dec. 25, 1934.   O. M. MILLER   1,985,260
STEREOSCOPIC PLOTTING OF CONTOUR MAPS
Filed June 3, 1930   6 Sheets-Sheet 4

Dec. 25, 1934.  O. M. MILLER  1,985,260
STEREOSCOPIC PLOTTING OF CONTOUR MAPS
Filed June 3, 1930    6 Sheets-Sheet 5

INVENTOR
Osborn M. Miller
BY
Edward Thomas
ATTORNEY

Dec. 25, 1934.  O. M. MILLER  1,985,260
STEREOSCOPIC PLOTTING OF CONTOUR MAPS
Filed June 3, 1930   6 Sheets-Sheet 6
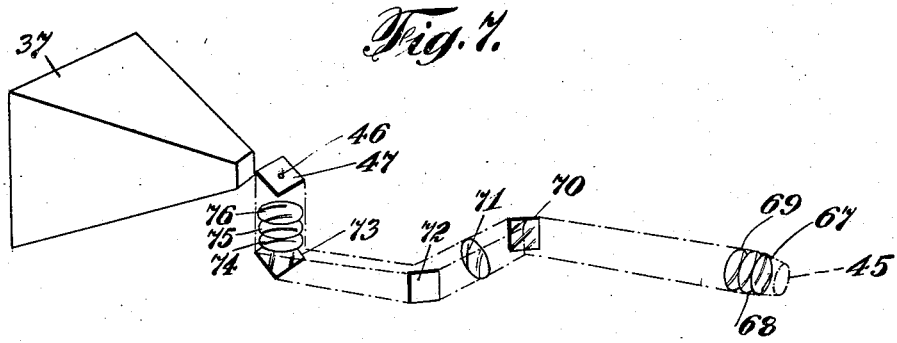
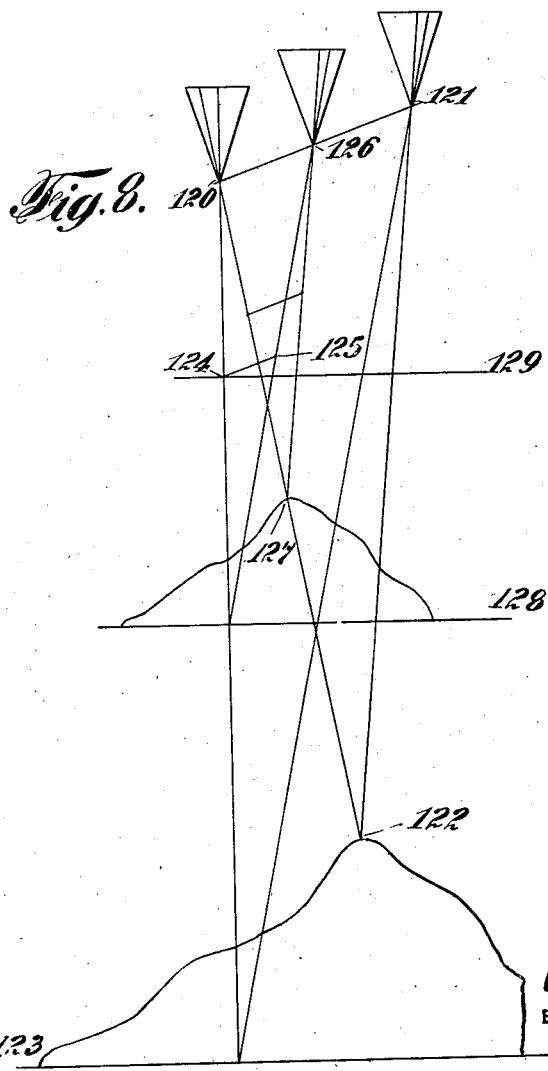
INVENTOR
Osborn M. Miller
BY Edward Thomas
ATTORNEY

UNITED STATES PATENT OFFICE

1,985,260

STEREOSCOPIC PLOTTING OF CONTOUR MAPS

Osborn M. Miller, New York, N. Y.

Application June 3, 1930, Serial No. 459,063

14 Claims. (Cl. 33—20)

This invention relates to stereoscopic plotting of contour maps and is herein illustrated, for the sake of simplicity, as embodied in a hand operated device adapted to plot contour maps from aerial photographs of land.

According to the present invention the machine or device employs one or two real, not virtual, index marks. In the form illustrated, separate index marks for each eyepiece are employed, connected together by an adjustable base made to remain parallel to the eyes in any position. Thus the machine may be set to plot to a given scale, and when the plotting is based on consecutive photographs sufficiently overlapping each other it will continue to plot successive areas to the same scale whether or no the natural scales of the individual photographs, or the length of the air bases vary.

In the form of the invention herein illustrated the photographs from which the plotting is done are viewed as reflected in mirrors and the real index mark or marks is or are viewed through a pinhole opening in the mirrors. There is also provided a substantially full view of the photographs, each through its own eyepiece, thus facilitating the lining up of the photographs to obtain the full stereoscopic effect and avoiding any need for moving the optical parts of the machine during the process of plotting.

In this form of the invention the tiltable mountings for the photographs are so interrelated that the introduction of a further photograph for further plotting of a continuous map and without alteration of the scale of plotting, can be readily effected. Thus the whole of the operation may be carried out by a person of mechanical skill, no mathematical calculations being required, although some elementary trigonometrical calculations facilitate the substitution in the machine of a new photograph in the consecutive series.

The machine illustrated is adapted to plot photographs taken in cameras whose optical axis at the time of exposure may have varied from the vertical and have been at different heights from the ground plane, and for these reasons it is provided with devices for tilting the base line joining the pinholes around the optical axis of one eyepiece, and with camera supports adapted to tilt the cameras in conjunction with or independently of the tilting of the base. To this end, in the machine illustrated, the camera, which is viewed by the eyepiece about whose optical axis the binocular base tilts, is so related to its pinhole mirror that tilting the camera does not alter the plane of orientation, but change in orientation alters the direction of tilt, this being accomplished by having the tilting mechanism, or the pivot of turning mounted on the orientation frame. An additional rotational movement of this camera about its own axis which is mounted on the tilting frame, can be also provided. This eliminates certain computations in the transference of one photograph to this framework from the other. But this additional movement, not being necessary for the successful operation of the machine, is not herein illustrated.

The movement of the other camera about its pinhole mirror is shown as such that its longitudinal tilt is parallel to the tilt of the binocular base, thus avoiding need for complicated computations of the combined effects on the total tilt of the camera to the map plane carried by tilting the air base and the camera.

The mechanism is such that two index marks when viewed through their respective pinholes will merge and appear in stereoscopic relief when they stand at or above the ground image, and they may appear to separate when they seem to be below the ground surface. To effect this they are illustrated as viewed through eyepieces that take rays parallel at the pinhole and focus them at the eye, or, in other words, the "virtual eye" is at the open pinhole. The index mark is thus readily utilized for measuring and plotting the relative positions of points common to two photographs by a person of mechanical skill, without mathematical computations.

Other features and advantages will hereinafter appear.

In the accompanying drawings:

Fig. 2 is a diagrammatic section of the optical system.

Fig. 3 is a diagrammatic section of a mirror through its pinhole showing the lines of light rays.

Fig. 7 is a skeleton perspective view of the optical system of one eyepiece of the same.

Fig. 8 is a diagrammatic view showing the relationship of the points on the device to the points from which the photographs were taken.

Figure 1:
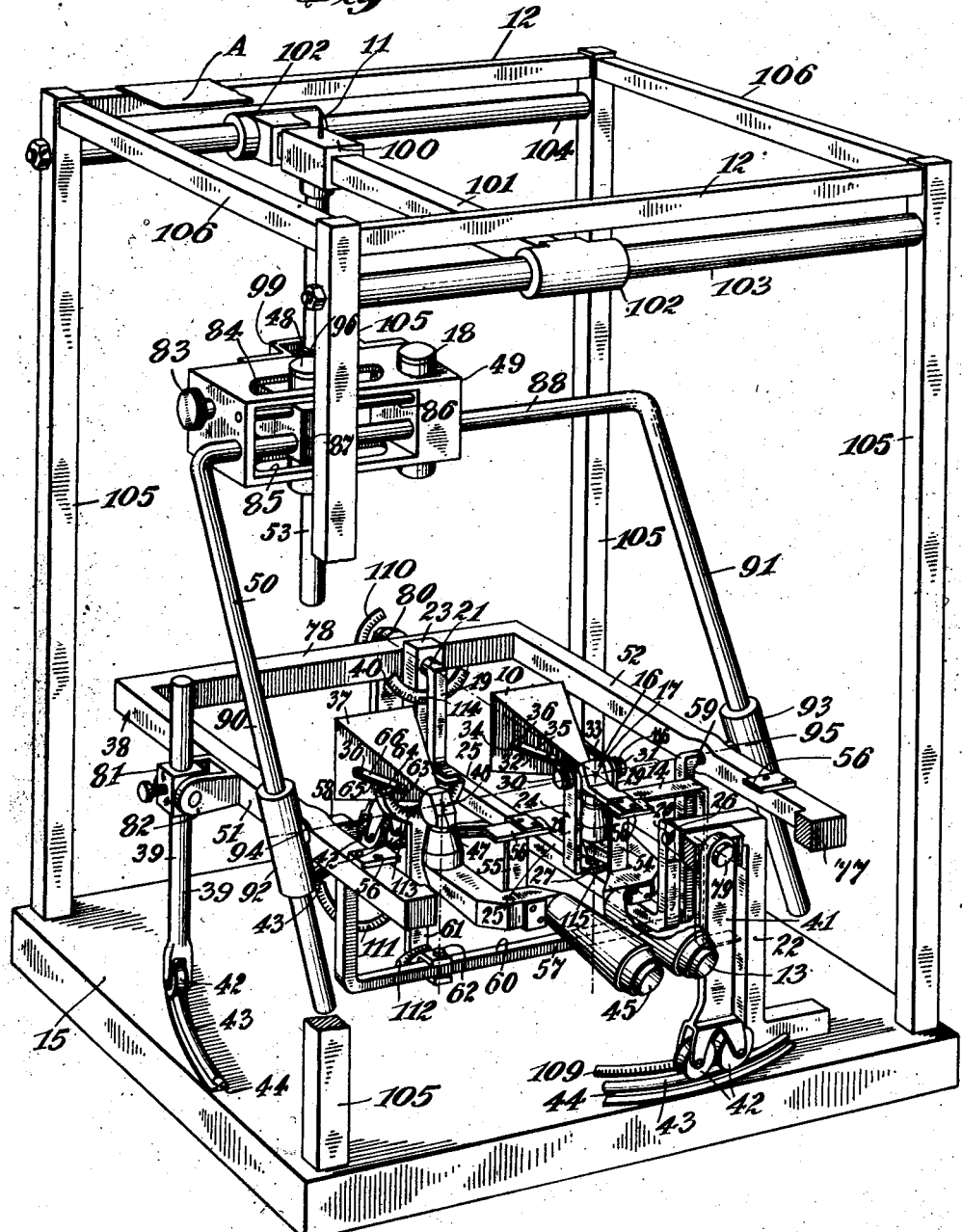
Fig. 1 is a perspective view of one form of the device.

The form of device illustrated includes a rectangular base 15, having four uprights 105, at its corners, which carry a pair of outside transverse bars or stringers 12 and a pair of outside fore-and-aft bars or stringers 106.

On the base 15 are supported broken circular arcs 43 of a rail 44, serving as a track for three sets of rollers 42.

The rollers 42 are journalled in the bottoms of a rear supporting post 40, a side supporting post 39 and a front supporting post 41.

The front and rear posts 41 and 40 are shown in Figure 1 at the right of the center of gravity of the frame 38 which they support and which is made up of a rear bar or stringer 78, a front bar or stringer 77, a right hand bar or stringer 52, and a left hand bar or stringer 51. The function of the frame 38, is most easily conceived of as a settable orienting table, and the frame may be a solid casting to provide a rigid structure.

To provide for tilting the orienting table 38 the front post 41, and rear post 40 are pivoted respectively by horizontal pivots 79 and 80 to the front stringer 77 and the rear stringer 78, and are kept upright because they are each carried on a pair of wheels 42, running on their respective arcs 42, the posts being for this purpose forked at the bottom so each wheel runs in one branch of its fork.

The left hand leg or post 39 may be utilized to tilt the orienting table 38, on its pivots 79 and 80. For this purpose it is lockable by a thumbscrew threaded into a block 81, which is pivoted to swing a bracket 82 fast to the side bar 51 of the orienting table 38, but is adapted to slide up or down in the block 81 when the thumbscrew is released, thereby altering the plane of the orienting table 38.

The orienting table 38 is provided with a transverse stringer 56, shown as riveted to the side stringers 51 and 52, and fast, as by riveting, on the stringer 56 are two brackets 54 and 55 carrying, respectively eyepieces 13 and 45, rigidly mounted in the brackets.

The optical system of lenses and mirrors forming the left hand eyepiece 45 is diagrammatically shown in Figure 7, extending through the lens 67, lens 68, lens 69, mirror 70, lens 71, mirror 72, mirror 73, lens 74, lens 75 and lens 76. These are enclosed in a suitable straight tube or casing clearly shown in Figures 1, 4, 5 and 6, bent horizontally at right angles, to the left at the mirror 70, again horizontally at right angles at the mirror 72, and upwardly at right angles at the mirror 73.

The rigidly mounted optical system of lenses and mirrors for the right hand eyepiece 13 is identical, save that its mirror 70 bends the rays to the right, instead of to the left, and the mirror 72 is adapted to reflect the left hand rays forwardly.

The rays of light reaching the eye piece 45, through the lenses come from a camera 37 which is indirectly supported on the orienting table 38. The orienting table 38, for this purpose, includes a transverse bail 57 having one end 58 pivoted in the stringer 51 and the other end 59 pivoted in the stringer 52. On the bail 57 opposite the mirror 72 is pivoted an upstanding bracket 61 having a forked top provided with an arcuate track 63 lying in the plane of the lens 133 (see Figure 2) of the camera 37 and struck from the axis of the lens. The camera itself is fast to an arcuate bar 64 provided with shelves 65 on which rest the lugs 66 fast to the camera, so that the end of the camera is vertically opposite the axis of the lens 133.

The bail 57 is provided with a dropped section 60 where the pivot 62 is mounted, so that the rays of light between the mirror 47 and the lens 76 can travel vertically. The mirror 47 is mounted at the end of the tube or casing with the lenses 74, 75, 76, and so turns with the orienting table 38. There is a central pin hole 46 in the mirror 47, and the operator viewing a photograph in the camera 37 sees an index mark (not shown) vertically above the pin hole 46 and on the bottom of a suspended mount or hollow post 48.

The rays of light reaching the eyepiece 13, through the right hand lenses 67, 68, and 69, mirror 70, lens 71, mirrors 72, and 73, lenses 74, 75, and 76 come from the right hand camera 10. To support the camera 10 there are provided front and back standards 22 and 23 fast to the board base, preferably closer together than the length of the orienting table 15, including top journals 20 and 21, so located that the center line of the journals 20 and 21 passes through a pinhole 17 in an inclined mirror 16 which corresponds to the pinhole 46 mirror 47 of Figure 7. The inclined mirror 16 is rigidly supported upon a bracket 14 fast to the board base 15, so that the pinhole 46 of the mirror 47 forms a fixed center around which the orienting table 37 turns whenever it is set to a new position.

In the journals 20, 21 is carried a bail 19 carrying a vertical pivot 27 directly below the pinhole 17 on a deferred section 25 of the bail 19. The pivot 27 serves to support the camera 10 because on it turns a support 24 for the camera 10, having vertical arms 28 and 29. These vertical arms extend to opposite the pinhole 17 where they carry journals 30, 31, whose line of centers passes through the pinhole 17. The journal 30 carries a swinging arm 32 and the journal 31 carries a swinging arm 33. To enable the arms 32 and 33 to carry the camera 10, they extend backwardly in flat sections 34 providing lugs or shelves 35 on which the camera walls rest and are made fast by set screws 36.

When the operator looks through the eyepiece 13 he not only sees a photograph at the back of the camera 10, but, also, through the pinhole 17 sees an arrow or index mark, not visible, in the drawings, on the bottom of a mount 18 fixed in a carrier 49.

Figure 4:
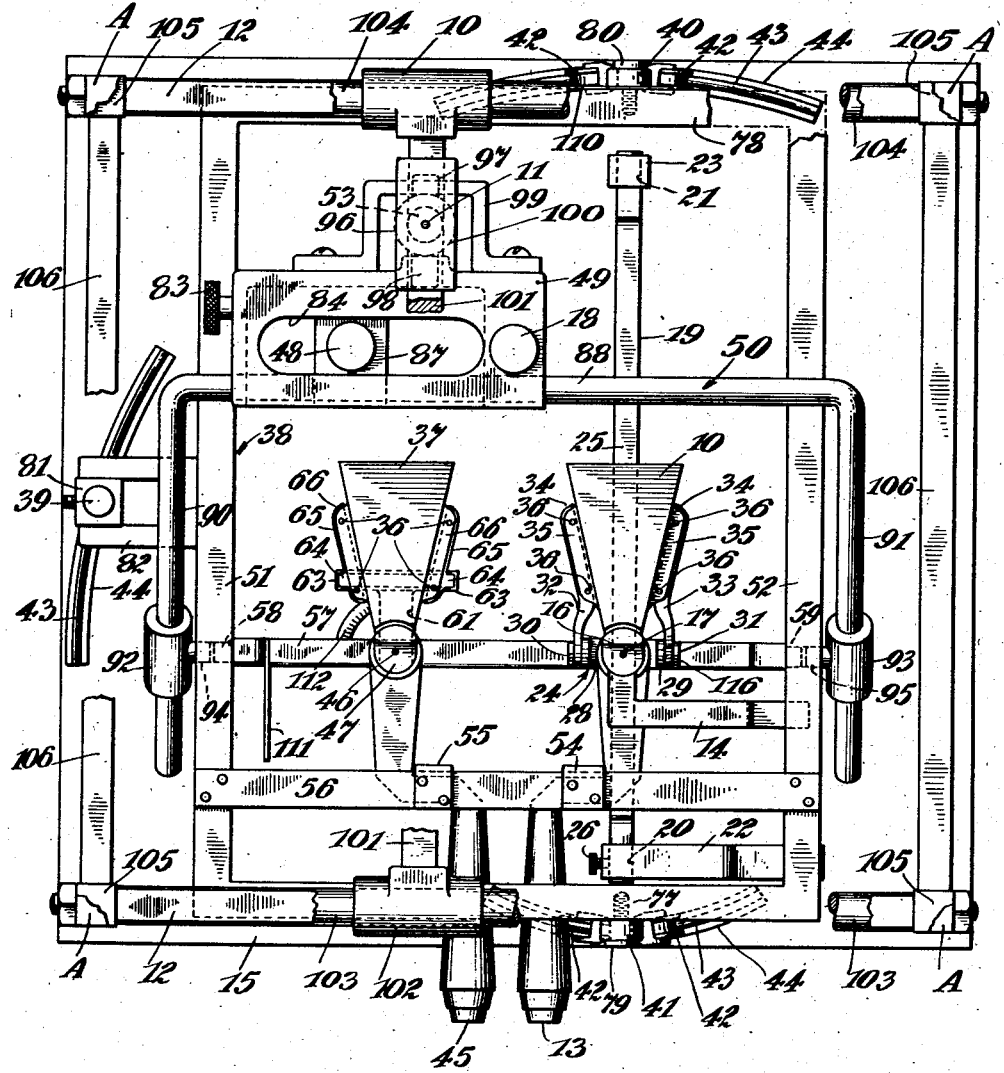
Fig. 4 is a top plan view of one form of the device with some upper parts broken away.
Figure 5:
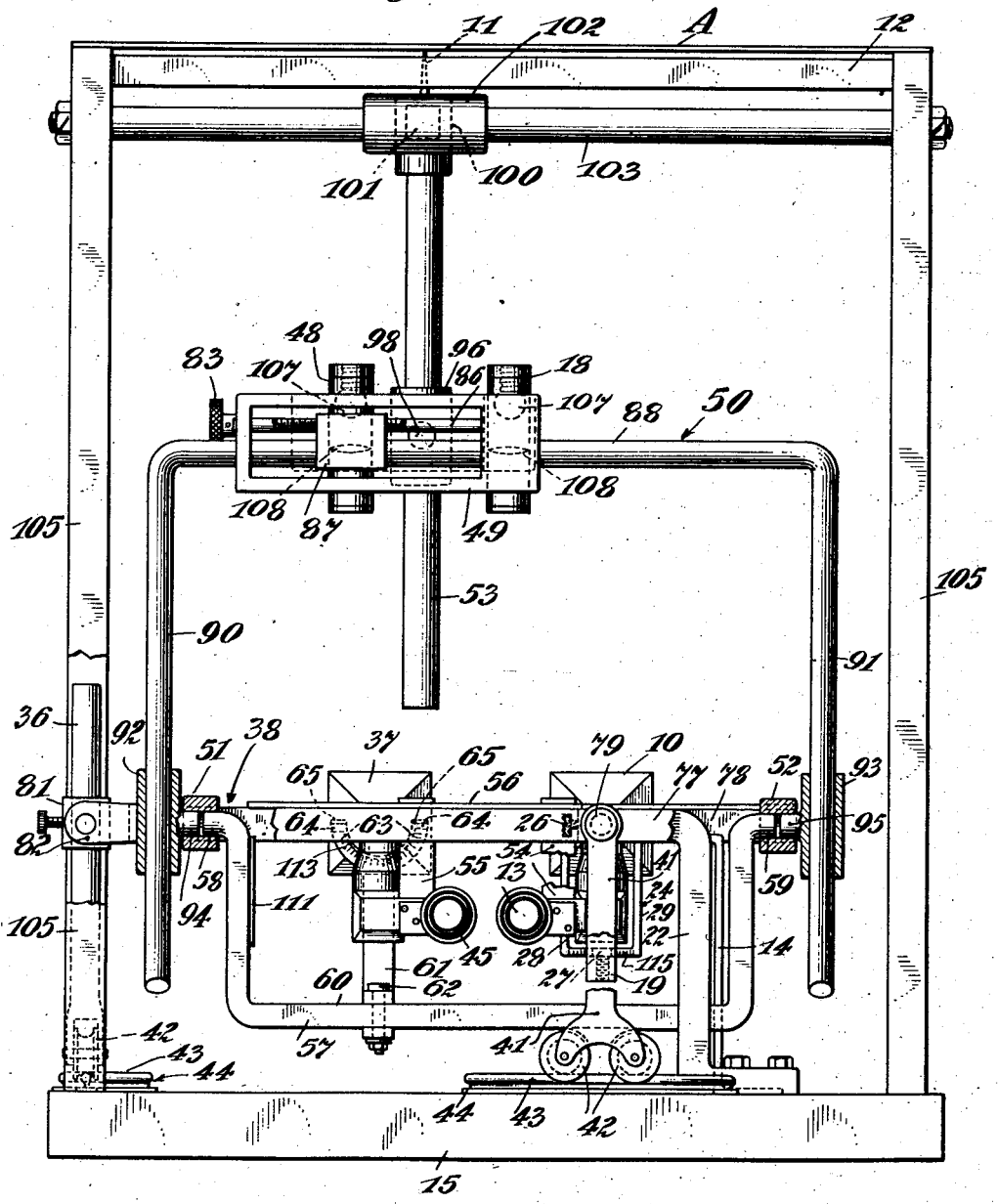
Fig. 5 is a front view of the same.
Figure 6:
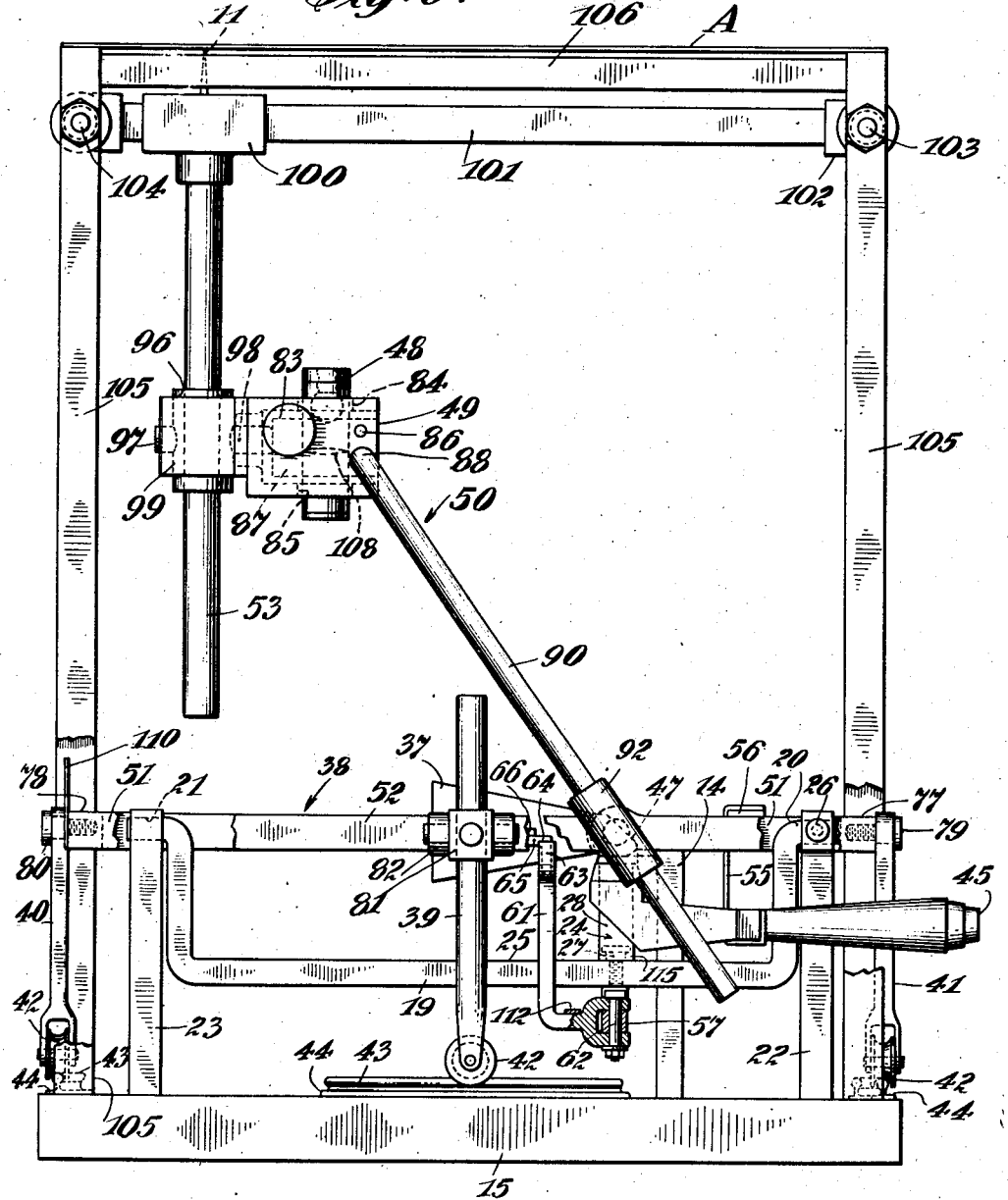
Fig. 6 is a side view of the same.

When the camera is properly tilted around its axis through the lens 133 it may be set by locking the bail 19 by a thumbscrew 26, (see Figure 4).

The mount 48 is carried by a slidable block 87 sliding transversely along the rail 86 of a carrier or support 49. A thumbscrew 83 mounted in the support 49, and having a thread which passes through the block 87, shifts the mount 48 along its support 49 to and from the mount 18 which is fixed in the support 49, the mount 48 being guided by top and bottom openings 84 and 85 in the support 49. Each mount 18 and 48 includes an electric bulb 107 and a condenser lens 108 for illuminating the respective index marks on the bottom of the mounts not visible in the drawings.

The block 87, as stated, is carried on a support 49. Fast to a bracket 99 and on the support 49 are stub shafts 97, 98, and these shafts engage the rock on a sleeve 96 which latter is free to rotate about the vertical shaft 53, and is in addition adapted to be fixed at adjustable heights, by means of an auxiliary screw (not shown) on the vertical shaft 53. The vertical shaft 53 is fast to a slidable carriage 100, carrying on its upper surface an index marker or pointer 11 for drawing the desired map. The sheet on which the map is to be drawn is on the support A, diagrammatically shown on the stringer 12.

A transverse stretch 88 of a bail 50 slidably passes through the support 49 so that the support is constrained to keep always parallel to the stringer 78 of the orienting table 38, the bail 50 being provided with legs 90 and 91 which slide in slide tubes 92 and 93, pivoted (see Figure 5) by trunnions 94 and 95 on trunnions carried in the side bars 51 and 52 of the orienting table.

The slidable carriage slides on a cross bar 101 which slides at each end by long slides 102, there being a front cross bar 103 bolted to the uprights 105 for the front slide 102 to slide upon, and a rear cross bar 104 bolted to the rear uprights for the rear slide 102 to slide upon.

The scale 109, fast to the base 15 near the front, (Figure 1), assists in locating the horizontal angle of orienting table 38. The scale 110 fast to the standard 40 serves to locate its vertical angle.

The vertical scale 111 fast to the bail 57 serves to locate its angle of tilt. The horizontal scale 112 fast to the bail 58 serves to locate the angle of the pivoted bracket 61. The vertical scale 113 fast to the arcuate track 63 serves to locate the angle of vertical twist of the camera 37. The vertical scale 114 fast to the post 23 locates the angle of the bail 19. The horizontal scale 115 locates the angle of the support 24 on the bail 19. The vertical scale 116 locates the drop of the camera 10 around the pinhole 17.

The new device, herein illustrated, provides a real index mark, provides a pinhole through a mirror by which to view the mark, and provides means for moving the mark to draw a map while the eye pieces and optical parts carrying lenses remain stationary.

In preparing to plot a map under the simplest conditions with the device illustrated, the operator mounts in the right hand camera 10 by any usual or suitable devices one of the photographs from which the desired map is to be made, having previously marked on the photograph at least the optical center of the photograph and three ground points which have been identified and located by triangulation.

In the device illustrated a sheet or map A rests on the top bars 12 of the frame of the device and is held rigidly flat as being mounted on a board. An index marker or pointer 11 can be made to move across the surface of this sheet in a manner to be described later. The operator then views the photograph in the camera 10 through its eyepiece 13, supported in a manner to be described later.

As the operator looks thru the eyepiece 13, he sees the photograph in the camera 10 through a system of lenses and reflecting device which will be described below, and as reflected in a mirror 16, which, in the form illustrated is carried on a fixed bracket 14 supported on the base of the machine, which will, for clarity be termed the board base.

The lenses are preferably wide angle and so proportioned that the plotter sees the whole of the photograph. As he views the photograph, he also sees through a pinhole opening 17 in the mirror 16, an illuminated index mark on the bottom of a mount 18 which is connected to move horizontally in two dimensions with the index marker 11.

The index mark can be made to appear at the marked optical center of the photograph provided the photograph is in a normal position by being set vertically above the pinhole. Then the operator shifts the index mark 11 to a distance and in a direction on the map or sheet A which corresponds aproximately at the scale it is desired to plot to the distance and the direction from the plate center to the previously marked ground points on the photograph as measured before putting it into the camera. Then the operator looks through the eyepiece 13, and, usually, finds that the index mark in its new position fails to coincide with the marked ground point. He then orients the photograph in the camera by rotating the camera 10 around the horizontal axis passing through the pinhole 17. For this purpose the camera is carried upon a bail 19 journalled at 20 and 21 on standards 22 and 23 fast to the board base 15 so that the line of the journals passes through the pinhole 17, and the camera is carried on a vertical support 24 in a manner hereinafter described, the support 24 being mounted on a depressed section 25 of the bail 19.

The operator having rotated the camera to an approximation of the correct orientation to bring the index mark on the mount 18 to one of the marked ground points, fastens the bail 19 by a suitable locking device 26 only conventionally shown. Then the operator usually rotates the support 24 upon its pivot 27 located on the bail 19 directly below the pinhole 17, until the photograph in the camera 10 further approximates to the desired position of the marked ground point with the index mark on the mount 18. If the plotter thinks it desirable he then, or previous to rotating the bail 19, moves the index marker or pointer 11 to the relative position on the map of a second one of the marked ground points.

The operator having thus located the camera 10 so as to set it approximately with reference to one or two of the marked ground points on the map A, locks the vertical support 24 by a suitable device, not shown.

The operator usually then further adjusts the camera by rotating it vertically around the pinhole 17 as a center. For this purpose the vertical support 24 is shown in the shape of a U with arms 28 and 29, provided at their upper ends with journals 30, 31 whose axes passes through the pinhole 17, each journal 30, 31, carrying a swinging arm 32, 33 so that they are adapted to carry the camera 10 between them. In addition it may be found convenient in order to avoid computations in the transference of a photograph and camera from one framework to the other to provide camera 10 with an additional rotational movement (not shown) about its own axis in the same manner as is provided camera 37, by mounting it on a similar standard 61 containing arcuate track 63 which will be described more fully later.

To thus carry the camera 10, each arm has a flat stretch 34, upon which a lug or shelf 35 on the camera wall is adapted to rest, and to which the camera may be made fast by a screw or screws 36. The plotter having approximated the marked ground point on the photograph to the index mark on the mount 18, or having approximated another marked ground point on the photograph to the index mark on the mount 18 after the latter has been relocated at another marked ground point on the map, locks the camera as thus set. He then usually finds it advisable to modify the position of the ball 19 to correct changes, or to more closely approximate the marked ground points on the photograph to one or more of the various set positions of the index mark on the mount 18 mentioned above. If the photograph was taken at such a distance above the ground that the marked ground points appear too close together or too far apart he adjusts the height of the index mark by mechanism which will be described later.

When the operator has, by successive approximations, finally located the camera 10 satisfactorily, he turns his attention to a second camera 37 which is differently mounted and contains another photograph of the same area for reasons which will later appear.

The first operation of the operator in setting the second camera, if the two photographs were taken from the same height, is to orient the second camera, so that the features shown on its photograph can be made stereoscopically to coincide with the photograph in camera 10. For this purpose the camera forms part of an orienting table 38 which is supported by legs 39, 40, 41, resting by rollers 42, on arcs 43 of circular track rails 44 having their centers struck from the pinhole 17. In addition to orienting the camera by the table 38, the operator at the same time orients the camera by rotating the camera around its optical axis, provision for which will be shortly described.

The operator sets the orienting table by viewing the photograph in the camera 37 through an eyepiece 45 forming part of a second series of lenses and reflecting devices precisely symmetrical with those for the eyepiece 13. The photograph has been previously marked at its center point and at the three or more ground points identified on the photograph in the camera 10, and as he views the photograph he sees through a pinhole 46 in a second mirror 47, a second illuminated index mark on a second mount 48, which is held, during any given plotting, at a fixed distance from the index mark on the mount 18.

The operator orients the camera 37 by rotating the orienting table 38 on its rollers 42 and at the same time rotates the camera around its optical axis by turning it on a track or guide 63 described below.

The support 49 for the mounts 18 and 48 is connected by a bail 50, pivoted on the side bars 51 and 52 of the orienting table 38, so that it turns with the orienting table 38, being for this purpose journalled to turn horizontally around the vertical shaft 53 to which the index marker 11 is fast. The index mark on the mount 48, therefore, is swung with the swinging pinhole 46, no matter how its mirror 47 turns with the orienting table 38, thus the line joining the two index marks is always parallel to the line joining the two pinholes.

The eyepieces 45 and 13 are both supported from the orienting table 38, being carried respectively by brackets 55 and 54, from a cross bar 56 which extends across the orienting table from the bar 51 to the bar 52. The mirror 47 for the eyepiece 45 and camera 37 is fixed to move with its eyepieces. As a result the orienting table 38 now orients the photograph in the camera 10 by turning the camera around the optical axis of the beam from the photograph to the eyepiece 13. Thus by orienting the orienting table 38 and the camera 37 both cameras are oriented until the ground points of the optical centers of the two photographs and their respective ground points seem to all lie on a straight line.

The operator then tilts the camera 37 forward or back to bring the photographs to fuse their images as nearly as possible by swinging forwardly or back a bail 57 pivoted at its ends 58, 59 in the bars 51 and 52 and carrying the camera 37 supported above a depressed section 60 of the bail. The journals or pivots of the ends 58, 59 are always in line with the pinholes 46 and 17.

The operator then or simultaneously with the last movement can swing the camera 37 laterally to bring the marked ground point of the photograph to the mark on the mount 48 or to further approximate its photograph with the photograph in camera 10. For this purpose the camera 37 is carried upon a standard 61 pivoted upon the depressed part 60 of the bail 57 by a pivot 62 directly under the pinhole 46 in the depressed position of the bail.

The standard 61 has an arcuate track 63 lying in a vertical plane struck from the axis of the camera lens, and in this track 63 lies an arcuate bar 64 which supports the camera 37. To support the camera on the bar 64 the bar is provided with flat extensions or stretches 65 on which lie the lugs or shelves 66 of the camera, preferably identical with the lugs 35 of the camera 10, so that the cameras are interchangeable, and are each held by screws 36 on the stretches 34 and 65.

The process of successive approximations of the camera 37 to the desired position is repeated until it, as well as the camera 10 are properly located. Then the operator views the photographs and their respective index marks 48 and 18 through the eyepieces 13 and 45. The two index marks on the mounts 18 and 48 will seem to fuse, and by raising or lowering their support 49 he can make the fused image seem to stereoscopically lie on the surface of the stereoscopic image of the landscape. Thus by moving the index marker 11 it can be made to trace lines of contour intervals on the map A.

The optical system between the eyepieces 13 and 45 and their respective pinhole mirrors 17 and 46, is illustrated in Figures 2 and 7. The left eye of the plotter looks through the eyepiece lens 67, and theoretically good results are obtained when lens 67 has for one machine a focal length of 7 units with an aperture of $f/2$, and is next a lens 68 having a focal length of 10 units with an aperture of $f/2.4$ followed by an identical lens 69. The rays are then reflected outwardly by a mirror 70 to increase the effective distance between the eyes, and pass through a lens 71 forming the center of a symmetrical system and having a focal length of 8.65 units and an aperture of $f/3.6$. Then the rays are reflected forwardly by a mirror 72 to a mirror which reflects them upwardly toward the pinhole mirror 46. Between the mirrors 73 and 46 the rays pass through lenses 74, 75, 76 which may be identical with the lenses 69, 68, 67 respectively.

This gives the desired effect without magnification, the pinhole and the eye being at equal distances from their respective lenses. Figure 2, omitting the mirrors 70, 72 and 73, shows the symmetry of the optical system. As clearly indicated in Figure 2, the cameras are each provided with a lens 133 placed at its focal length from the plane of the photograph so that the issuing rays from the photograph are parallel, thus the illuminated index marks on the mounts 18 and 48 are clearly seen when the photographs in the cameras are clearly seen.

If one of the photographs was taken at a greater or smaller distance from the earth than the other, an additional adjustment is necessary, and for this purpose the orienting table 38 is tiltable around the horizontal axis passing through the pinhole 17 and at right angles to the line joining the two pinholes, when the parts of the device are in normal position. To effect this the front and rear legs 40 and 41 are diagrammatically shown as pivoted at their upper ends to the front and rear bars 77, 78 of the orienting table by pivots 79 and 80, respectively, and the side leg 39 is shown as passing through a block 81 pivoted to a bracket 82 fast to the side bar 51 of the orienting table 38.

The illuminated index marks on the mounts 18 and 48 form what may be called a parallactic or comparator base, and, by adjusting the length of this base, the scale of the map which is being plotted may be made constant no matter what the length of the air base between the two photographs happens to be. To effect such adjustment the mount 48 may be slid along the support 49 as by rotating a thumb screw 83, the support 49, for this purpose, being hollow and provided with top and bottom openings 84, 85 through which the mount 48 projects, and being also provided with a slide rod 86 embraced a block 87 in which the mount 48 is carried. The block 87 also is bored to fit closely the transverse member 88 of the bail 50. The vertical slide rod 53 passes through a bracket 99 at the back of the support 49.
To permit the bail 50 to hold the support 49 parallel to the line joining the eyepieces 13 and 45, which may be called the optical base, provision is made for tilting the support 49 by the bail 50 when the orienting table tilts. For this purpose the legs 90, 91 of the bail 50 slide in long sleeves 92, 93, pivoted at 94, 95 on opposite sides of the orienting table 38, on the side bars 51, 52.

To permit the support 49 to tilt with the tilting of the table 38, the vertical shaft is connected to the support 49 by a sleeve 96 journalled on the support 49 by stub shafts 97, 98 in a bracket 99 at the back of the support 49.

The vertical shaft 53 is adapted to hold the mount 49 at any height to which it is set, as by being provided with a screw thread.

The index pencil or marker 11 is shown as carried by a slide 100 which moves forwardly or back upon a slide rod 101, driven as by a screw, not shown, and the slide rod 101 in turn is carried by a front slide 102, sliding on a transverse slide rod 103, and also sliding on a back slide rod 104. Said slide rods are supported rigidly from the base board 15 as on uprights 105 held together at the top by stringers 106.

The index marks on the mounts 18 and 48 are shown (Figure 5) as illuminated from above by electric lamps 107 shining through lenses 108 and mounted in the respective mounts. Thus the index marks may be made as bright as needed so as to be clearly seen through the pinholes and the operator will have no difficulty in seeing them virtually lying upon the land, and causing them to remain merged, with the result that only mechanical skill is needed to trace the contour lines or other lines upon the desired map.

After the operator has completed the desired drawing from one pair of photographs the angles at which the left hand camera and photograph are set may be observed on the scales 109, 110, 111, 112, 113 and the photograph, or preferably the camera, may be transferred to the right hand mounting 32, which is also provided with scales 114, 115, 116, and set up with a minimum of computations. In fact the only necessary computation is the ascertaining of the relative positions of the perspective centers of the two photographs.

A new largely overlapping photograph is now set up in the left hand camera 37 and adjustments made to obtain a stereoscopic image jointly from it and the photograph now in the right hand camera. It is usually unnecessary now to mark any ground points, and the operator proceeds as before, making as many new adjustments as necessary.

As a guide to utilizing this device for making maps to scale Figure 8 shows the relationship of the points 120 and 121 from which photographs of a ground point 122 were taken above a datum line 123. The points 124, 125 show the ends of the parallactic base, and the point 126 shows the relationship of the binocular base 120, 126 to the air base 120, 121. The point 122 of the ground appears as the point 127 above a virtual map plane 128. The real map plane is shown at 129.

In Figure 3, the light from the index mark in various positions comes by rays 130, through the pinhole 17, merging with reflected rays 131 which have originally struck the mirror 16 as rays 132.

For simplicity the marking pencil 11 has been shown as mounted directly on the slide 100, but it will often be found more convenient to replace the pencil point 11 by a pin, and to operate a pencil at some more visible or convenient location by mechanism driven or controlled by the pin 11.

Having thus described one embodiment of the invention, what I claim is:

1. A unit for use in drawing a map from a photograph including an eyepiece, a mirror set at an angle and including a pinhole, a system of lenses adapted to deliver rays parallel at the mirror so as to focus at the eyepiece, a camera adapted to hold a photograph, a lens in the camera for viewing the photograph, means for holding the camera turned on its axis, means for holding the camera tilted sideways, and means for holding the camera tilted endwise, so as to set the plane of the camera relative to the axis of sight through the pinhole.

2. A unit for use in drawing a map from a photograph including an eyepiece, a mirror set at an angle and including a pinhole, a system of lenses adapted to deliver rays parallel at the mirror so as to focus at the eyepiece, a camera adapted to hold a photograph, a lens in the camera for viewing the photograph reflected in the mirror, means for holding the camera set with its photograph at various angles, and an index mark movable independently of the optical system including the eyepiece and lenses for following a line on the photograph.

3. A device for use in drawing a map from photographs including an eyepiece, a mirror set at an angle and including a pinhole, a system of lenses adapted to deliver rays parallel at the mirror so as to focus at the eye-piece, a camera adapted to hold a photograph, a lens in the camera for viewing the photograph reflected in the mirror, means for holding the camera set with its photograph at various angles, an index mark movable independently of the optical system including the eyepiece and lenses for following a line on the photograph, a second eyepiece, a second mirror separately settable and including a separate pinhole, a separate system of lenses delivering rays parallel at the second mirror so as to focus at the second eyepiece, a second camera adapted to hold a second photograph to be viewed stereoscopically with the first, separate means for holding the second camera set at various angles, and a separate index mark separately settable with reference to the first but movable therewith to be seen through the second pinhole.

4. A device for use in drawing a map from photographs including an eyepiece, a camera for the eyepiece adapted to hold a photograph, means for holding the camera oriented, means for holding the camera tilted, means for holding the camera turned, a second eyepiece, a second camera for the second eyepiece adapted to hold a second photograph, means for holding the second camera turned, means for holding the second camera tilted, and means for simultaneously orienting the second camera and its eyepiece while the first camera and its eyepiece remain fixed to enable the two photographs to be viewed stereoscopically.

5. A device for use in drawing a map from photographs including an eyepiece, a camera for the eyepiece adapted to hold a photograph, means for holding the camera oriented, means for holding the camera tilted, means for holding the camera turned, a second eyepiece, a second camera for the second eyepiece adapted to hold a second photograph, means for holding the second camera turned, means for holding the second camera tilted, means for simultaneously orienting the second camera and its eyepiece while the first camera and its eyepiece remain fixed to enable the two photographs to be viewed stereoscopically, an index mark mount for each eyepiece, and a connection between the simultaneously orienting means and the mounts compelling the mounts to keep oriented in unison with the eyepieces.

6. A device for use in drawing a map from photographs including an eyepiece, a camera for the eyepiece adapted to hold a photograph, means for holding the camera oriented, means for holding the camera tilted, means for holding the camera turned, a mirror between the eyepiece and camera including a pinhole, a mount carrying an index mark visible through the pinhole, a second eyepiece, a second camera for the second eyepiece adapted to hold a second photograph, means for holding the second camera turned, means for holding the second camera tilted, a second mirror between the second eyepiece and the second camera including a pinhole, a second mount carrying a second index mark visible through the pinhole in the second mirror, and a connection between the simultaneously orienting means and the mounts compelling the mounts to keep oriented in unison with the eyepieces.

7. A device for use in drawing a map from photographs including an eyepiece, a camera for the eyepiece adapted to hold a photograph, means for holding the camera turned, means for holding the camera tilted, a mirror between the eyepiece and camera including a pinhole, a second eyepiece, a second camera for the second eyepiece adapted to hold a second photograph, an orienting table carrying the second camera and second eyepiece and adapted to orient them around the pinhole of the first mirror, a second mirror between the second eyepiece and its camera and having a pinhole, a mount carrying an index mark for the first eyepiece, a second mount carrying a second index mark for the second eyepiece, and settable with reference to the first mark, a movable support for the mounts, and a connection from the orienting table from the movable support so that the mounts move as controlled by the orientation of the table.

8. A device for use in drawing a map from photographs including a pair of separately settable cameras, each adapted to hold a photograph, a pair of eyepieces for viewing the photographs stereoscopically, one eyepiece being separately settable, a pair of separate mounts each carrying an index mark, means for setting one mark relatively to the other, a support carrying said mounts for moving them in unison in drawing a map, and means whereby the relative setting of the eyepieces controls the relationship of the mounts as they move in drawing a map.

9. A device for use in drawing a map from photographs including a pair of separately settable cameras, each adapted to hold a photograph, a pair of eyepieces for viewing the photographs stereoscopically, one eyepiece being separately settable, a pair of mounts each carrying an index mark, a mirror including a pinhole between each eyepiece and its camera so that each index mark is visible through its own pinhole, means for setting one mount relatively to the other, a support carrying said mounts for moving them in unison in drawing a map, and means whereby the relative setting of the eyepieces controls the relationship of the mounts as they move in drawing a map.

10. A device for use in drawing a map from photographs including a pair of separately settable cameras, a pair of eye pieces for viewing stereoscopically the photographs in the cameras, a mirror between each eye piece and its camera, lenses forming an optical system for each eyepiece, said lenses adapted to bring each virtual eye of the observer to the surface of the mirror so that true parallel rays are reflected from each mirror.

11. A device for use in drawing a map from photographs including a camera, a separately settable camera, an eyepiece for each camera for viewing stereoscopically photographs in the cameras, a lens system between each eyepiece and its camera, and a pair of mounts including index marks visible through the eyepieces and movable independently of the lens systems to trace lines on the desired map.

12. A device for use in drawing a map from photographs including a relatively fixed camera, an eyepiece for the camera also relatively fixed, a separately settable camera, a second eyepiece, a mounting for the second eyepiece and settable camera adapted to move said second eyepiece and settable camera relative to said first camera and eyepiece as the first camera and eyepiece remain relatively fixed, a separate lens system between each eyepiece and its camera, a pair of mounts each carrying an index mark, and a connection between the eyepiece mounting and the pair of mounts to compel the mounts to hold their index marks as they move together in drawing a map so that when one is visible in its eyepiece the other is visible in its eyepiece.

13. A device for use in drawing a map from photographs including a relatively fixed camera, an eyepiece for the camera also relatively fixed, a separately settable camera, a second eyepiece, a mounting for the second eyepiece and settable camera adapted to tilt the eyepiece and adapted to set the second camera relative to said first camera and eyepiece as the first camera and eyepiece remain relatively fixed, a separate lens system between each camera and its eyepiece, a pair of mounts each carrying an index mark, and a connection between the tilting mounting and the pair of mounts to compel the mounts to hold their index marks as they move together in drawing a map so that when one is visible in its eyepiece the other is visible in its eyepiece.

14. A device for use in drawing a map from photographs including a camera, an eyepiece for the camera, a system of lenses between the eyepiece and the camera including a mirror having a pinhole, a separately settable camera, a second eyepiece for the separately settable camera, a separate system of lenses between the second eyepiece and the settable camera including a mirror having a pinhole, an orienting table turning on the first pinhole as a center and carrying the second eyepiece, the settable camera, their lenses and mirror, a pair of mounts each carrying an index mark visible through the respective pinholes, and a bail connected to the table and to the mounts to align the index marks in the eyepieces.

OSBORN M. MILLER.